H. MANN.
HOG FEEDER.
APPLICATION FILED JUNE 2, 1919.

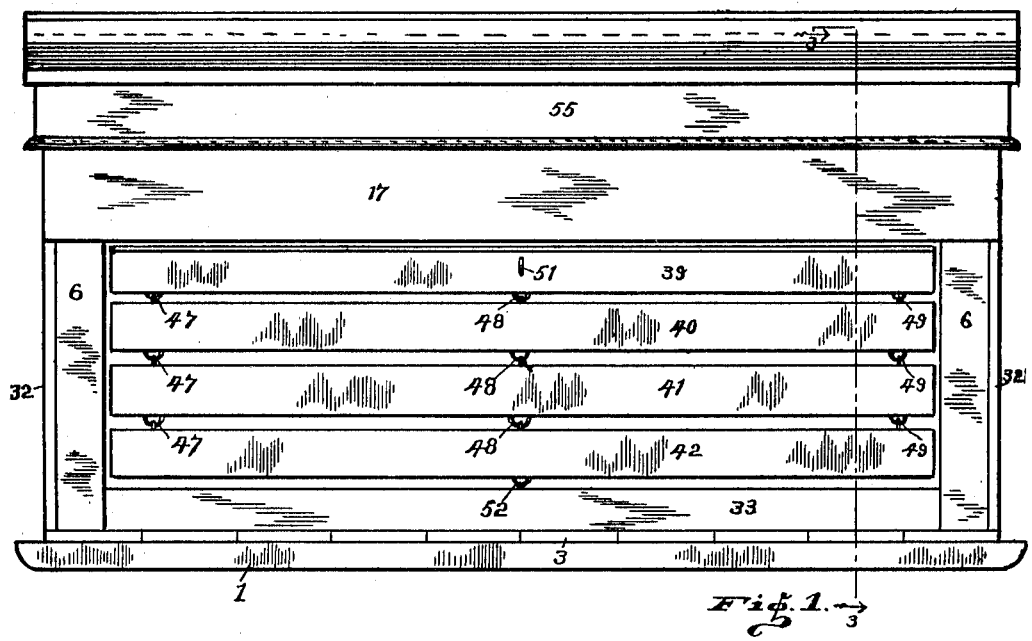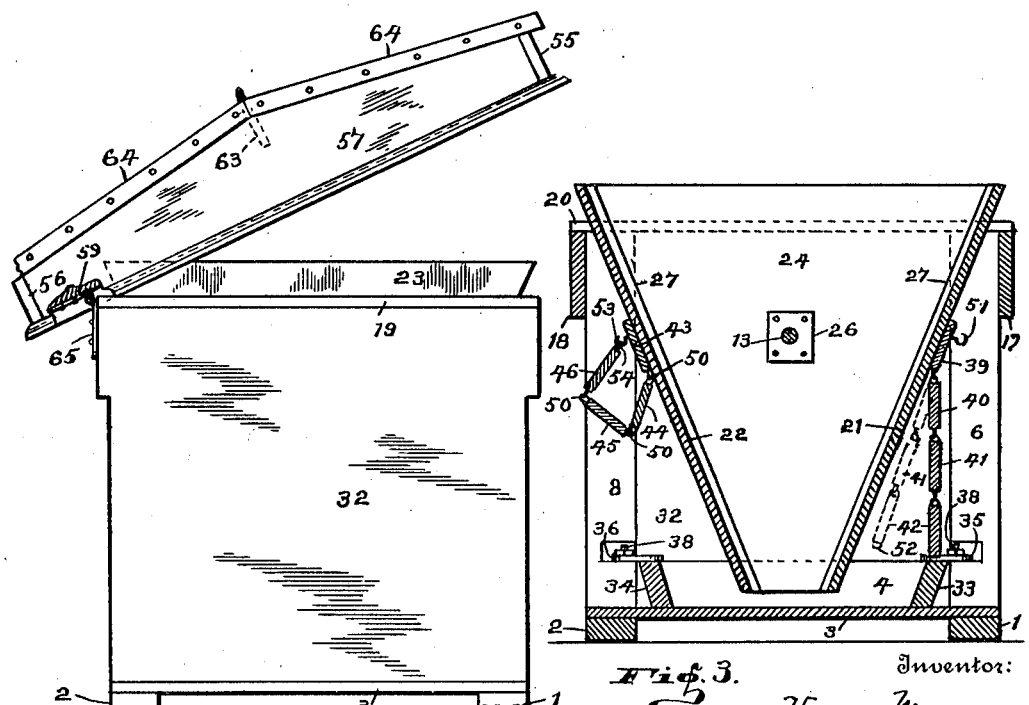

1,316,910.

Patented Sept. 23, 1919.
2 SHEETS—SHEET 2.

Witness:
Adelaide Kearns.

Inventor:
Harry Mann;
By Robert W. Taudle,
Attorney.

and and
UNITED STATES PATENT OFFICE.

HARRY MANN, OF RANDOLPH COUNTY, INDIANA, ASSIGNOR OF ONE-HALF TO THE STORMS NOVELTY COMPANY, OF WINCHESTER, INDIANA.

HOG-FEEDER.

1,316,910.        Specification of Letters Patent.     Patented Sept. 23, 1919.

Application filed June 2, 1919. Serial No. 301,281.

*To all whom it may concern:*

Be it known that I, HARRY MANN, a citizen of the United States, residing in Randolph county, State of Indiana, have invented a new and useful Hog-Feeder, of which the following is a full, clear, and comprehensive specification and exposition.

The object of this invention, broadly speaking, is to provide a gravity feeding device, for hogs or other animals, which will be strong and durable in construction, simple in arrangement, automatic in its operation, and which can be manufactured and sold at a comparatively low price.

More specifically stated, my object is to provide a gravity stock feeder having a relatively stationary floor with end members connected at their upper corners and resting on the floor, with a cover for said parts, and a swinging hopper forming a bin, or bins, mounted between the end members and between said floor and the cover, and having means guarding the feed from weather and waste after it has been gravitated onto the floor or trough and preventing it from being used by animals or fowls other than that for which it is intended, and having means for adjusting the height of the hopper with relation to the floor in order to control the flow of feed as required.

Other objects and particular advantages of the invention will be brought out in the course of the following description taken in connection with the accompanying drawings forming a part thereof, and as set forth in the claims terminating this specification.

The preferred means for carrying out the principles of my invention in a practical and economical manner is shown in the accompanying drawings, in which—

Figure 4:
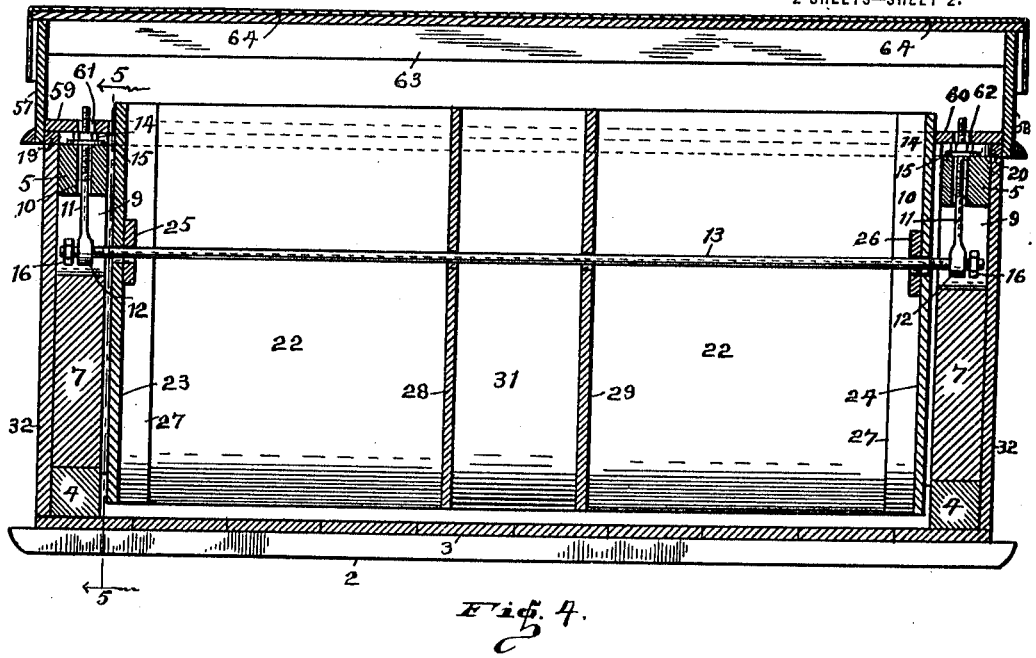
Figures 5, 6:
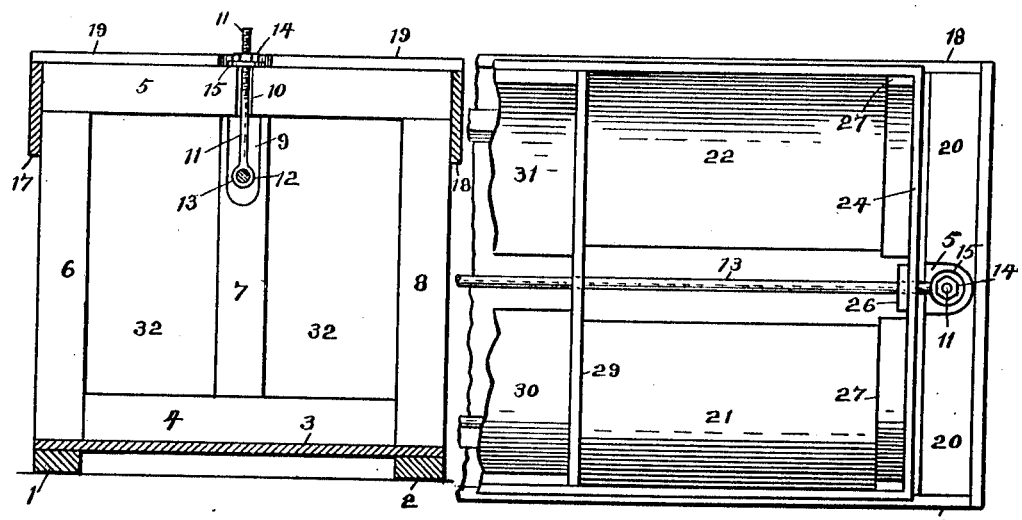
Figure 7:
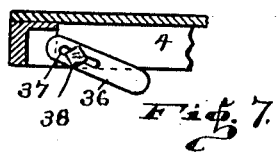

Figure 1 is a side elevation of the complete construction, the two sides of the device being identical with each other. Fig. 2 is an end elevation of the device, the top being shown partly open. Fig. 3 is a cross section, as taken on the line 3—3 of Fig. 1, but with the top omitted. Fig. 4 is a central longitudinal section of the device. Fig. 5 is an inside elevation of one of the ends of the stationary part, as taken on the line 5—5 of Fig. 4. Fig. 6 is a top plan view of a portion of the device, the cover being omitted. And Fig. 7 is a detail view of one of the stops for limiting the movements of the hopper.

Similar indices denote like parts throughout the several views.

In order that the construction, the operation, and the several advantages of my invention may be more fully understood and appreciated, I will now take up a detailed description thereof, in which I will set forth the same as fully and as comprehensively as I may.

Referring now to the drawings in detail, in which like characters denote like parts throughout the several views: Numerals 1 and 2 denote the sills, or runners which are adapted to rest or slide on the ground to support all of the other parts of the construction.

Connecting the sills and extending thereover is the floor 3.

There are two, relatively stationary, end members which are identical with each other, and they rise vertically from the ends of the base, and each of said end members comprises a base member 4, a top member 5 which is parallel with the latter, and the two being connected by the vertical posts 6, 7 and 8.

Each of the center posts 7 is forked at its upper end, that is a U-shaped slot 9 is formed therein longitudinally of the feeder. Also a small round aperture 10 is formed vertically through the center of the member 5, to receive the stem of the eye-bolt 11.

The bolts 11 each have a head 12 on its lower end with an eye therethrough to receive an end portion of the rod 13. A nut 14 is threaded on the upper portion of each of the bolts 11 which contacts with the washers 15, the latter resting on the members 5.

Nuts 16 are secured on the ends of the rod 13, adjoining the heads to prevent the rod 13 from becoming disengaged from heads 12.

The upper corners of the said end members are connected, on each side of the device, by the face-plates 17 and 18.

Covering the top of each of said end members, and secured on the members 5, are the caps 19 and 20, the central portion of each being cut away around the nut 14, and the washer 15, to allow room for the operation of the nuts 14 by a wrench.

The outer faces of the said stationary end members are covered by sheeting or weather-boarding 32, which of course covers the outer faces of the slots 19, and therefore incloses the ends of the rod 13 and the heads 12.

The hopper comprises the two sides 21 and 22, which extend down convergently, forming a mouth between their lower ends. The said sides are connected at their ends by the hopper-ends 23 and 24, which are located near to the end members first mentioned, but not in contact therewith. The rod 13 extends through apertures therefor in the members 23 and 24, there being bearings 25 and 26 secured to the inner faces of the respective members 23 and 24 in which said rod 13 is adapted to rotate.

From the above it is apparent that the hopper is suspended by the rod 13 on which it may swing forward and backward. Then by turning the nuts 14 the hopper may be raised or lowered in order to bring the mouth of the hopper farther from or nearer to the floor 3 in order to increase or decrease the gravitation of feed.

Numeral 27 denotes corner strips, located on the inside of the hopper to which the sides 21—22 and the members 23—24 are secured.

The hopper may be divided into a plurality of bins, as by the partitions 28 and 29, the same being secured to the reinforcing members 30 and 31 which are secured across the central portions of the respective sides 21 and 22. The rod 13 also extends through apertures in the partitions 28 and 29, as shown in Fig. 4.

Secured on the floor 3 and extending longitudinally of the device are the guards 33 and 34, which extend between the members 4—4, and they form the sides of the feed-trough in which the lower end of the hopper swings, in order to receive the feed therefrom.

The movements of the lower end of the hopper may be limited as desired by the two stops 35 and 36, one on each side, each having a slot 37 therethrough in which is disposed a tap-bolt 38 whereby both of said stops may be adjustably secured to one of the members 4 in such manner that the hopper may strike one or the other to limit the swinging of the hopper in either direction.

The two curtains, one for each side of the device, are each formed of a plurality of slats, comprising the slats 39, 40, 41 and 42 of the front curtain, and the slats 43, 44, 45 and 46 of the rear curtain. The slat 39 is permanently secured to the face of the member 21, while the slat 43 is likewise secured to the member 22, and they are located above the center of the respective members 21 and 22, substantially as shown in Fig. 3.

The slats on the front are spaced slightly apart and then hinged together by sets of screw-eyes 47, 48 and 49, while the slats on the rear are likewise hinged together as by the screw-eyes 50 shown in Fig. 3. A pair of screw-eyes form a single hinge, two of the screw-eyes being hooked together with one member of the pair secured in the edge of one slat and the other member of the pair secured in the edge of the slat next thereto. However it is to be understood that I am not limited to this particular hinging means.

In the center of the slat 39 is a hook 51, and in the lower edge of the slat 42 is an eye 52. Likewise in the center of the slat 43 is a hook 53, and in the lower edge of the slat 46 is an eye 54. The purpose of the hooks 51 and 53, and the eyes 52 and 54, is that the curtains may be secured up out of operative position, as shown at the left in Fig. 3.

The top or cover for the body of the device comprises first a frame including the front member 55 and a rear member 56, the same having their ends connected by the gable-end members 57 and 58.

Connecting the members 55 and 56, and adjoining the respective members 57 and 58, are the plates 59 and 60 which, when the top is closed rest flat on the respective caps 19 and 20 as shown in Fig. 4. Apertures 61 and 62 are formed through the center of each plate 59 and 60 to receive the ends of the respective bolts 11. The width of the top is considerably greater than is the width of the body of the feeder, in order that the top may protect the feed trough from rain or snow.

Connecting the peaks of the members 57 and 58 is the ridge bar 63, shown in dotted lines in Fig. 2. Secured over the frame of the top is the sheet metal roofing 64, which also projects down over the edges of the frame as shown, with its center on the ridge bar.

The top is connected with the body by hinges 65, only one of which hinges being shown, one leaf of each of the hinges being connected with the plate 18, and the other leaf of each hinge being attached to the under face of one of the plates 59 and 60, whereby the top may be turned back, as in Fig. 2, for placing feed in the bins.

The operation of my invention is so very simple that it may possibly have been anticipated from the above description, from which it will be seen that the feed is to be placed in the hopper, the two end bins being intended more particularly for dry feed and grains, while the center bin is intended for wet feed, as tankage or the like, or they may all be used for one kind of feed.

After the feed has been placed in the hopper the cover should be closed, as in Fig. 1, the curtains should be suspended as shown at the right in Fig. 3, and also in Fig. 1.

Now the animal desiring to feed places his feet on the floor 3, outward from the guards 33 and 34, pressing the curtain inward with his nose he then has access to the trough formed between the guards 33 and 34. As the animal endeavors to obtain the feed from the trough he will of necessity contact with the lower portion of the hopper thereby causing the hopper to swing and thereby resulting in distributing the feed over the floor of the trough, from which it is evident that the feed will gravitate down into the trough only as the animal swings the hopper in its feeding, and the feed will continue thus to gravitate until the animal quits feeding or until the feed is exhausted from the bins.

The curtains above described prevent the feed from being soiled or removed by fowls or birds, or small animals, and they also prevent animals from getting into the trough or from loafing therein. However if it be desired that small animals, such as pigs, may feed from the device then the curtains may be secured up out of the way, as shown at the left in Fig. 3.

I desire that it be understood that various changes may be made in the several details of construction from that herein shown and described without departing from the spirit of the invention and without sacrificing any of the advantages thereof.

Having now fully shown and described my invention, what I claim and desire to secure by Letters Patent of the United States, is—

1. A gravity stock-feeder comprising in combination, a flat base, end walls extending up from the base, face plates connecting the upper corners of the end members, a hopper having vertical ends and downwardly convergent sides forming a mouth between their lower edges and above the surface of the base, a pivot carried by each end of the hopper and operative in vertical slots in the end members whereby the hopper may swing between the end members and above the base, screw means for raising and lowering said pivots whereby the height of the hopper may be adjusted with relation to the base, a guard-rail extending between the end members and secured to the surface of the base on each side of the mouth of the hopper, a curtain suspended from each side of the hopper and adapted to hang down to near the respective guard rails, and means for folding the curtain up out of operative position whereby it may be secured out of operative position.

2. A stock feeder comprising in combination a flat base mounted on runners, end walls extending up from the ends of the base, plates connecting the upper corners of the end walls, a rod extending between the centers of the upper portions of the end walls, a hopper swingingly mounted on said rod and extending between the end walls, means for raising and lowering said rod to adjust the height of the bin with relation to the surface of the base, a curtain hinged to each side of the bin and extending down to near said base, each of said curtains comprising a plurality of slats extending horizontally from end to end of the hopper, means for hinging together the slats of each curtain whereby they may be folded up out of operative position, and means for detachably securing each curtain in its folded position, all substantially as shown and described.

In testimony whereof I have hereunto subscribed my name to this specification in the presence of two subscribing witnesses.

HARRY MANN.

Witnesses:
 ROBT. W. RANDLE,
 R. E. RANDLE.

Copies of this patent may be obtained for five cents each, by addressing the "Commissioner of Patents, Washington, D. C."